Patented July 21, 1931

1,815,761

UNITED STATES PATENT OFFICE

LEONARDO CERINI, OF CASTELLANZA, ITALY

TREATMENT OF VEGETABLE FIBERS OF OSMOTIC DIAPHRAGMS

No Drawing. Application filed August 23, 1929, Serial No. 388,039, and in Germany October 31, 1928.

It is already known that an impure solution of caustic soda and similar substances obtained, for example, in the manufacture of viscose, can be purified when subjected to dialysis with water during which alkalies pass into the water and impurities are discharged therefrom.

However, this convenient method of purification could not be carried out technically for a long time as there were no dialysing diaphragms allowing a continuous purification with satisfactory efficiency. Attempts have been made to use porous porcelain, cement plates, asbestos cardboard, parchment paper and the like as dialysing diaphragms, but all these substances did not prove adaptable in practice for the aforementioned purpose.

A remarkable progress in the dialytic purification of impure caustic soda solutions has been achieved by the introduction of diaphragms consisting of a fabric of vegetable fibers treated with concentrated alkali solutions. This invention has made possible for the first time the realisation of the continuous dialytic purification of caustic soda alkalies with an almost theoretical output.

According to the present treatment the diaphragms constituted of a fabric of vegetable fibres offer efficient resistance and satisfactory durability, the latter being however limited by a slow transformation, evidently due to the action of alkalies on vegetable fibers.

As a result of the prolonged influence of alkali solutions the gradual transformation of vegetable fibers takes place; the diaphragms become frangible and have to be replaced. The time when replacement is necessary depends on the conditions of work, on the composition of the solution and on the chemical and physical consistence of the diaphragms.

It has been found possible to obviate or to lessen the above-mentioned detrimental transformation of vegetable fibers by subjecting the fibers or diaphragms to the treatment described below. This treatment can be applied irrespectively to any diaphragms consisting of vegetable fibers, such as woven, paper, cardboard diaphragms etc. Experience proves that whilst cellulose-hydrates formed by the action of caustic alkalies are gradually soluble in water, those derived from earth metals, earth alkali metals or compositions of metals having similar effect show different properties being either more, less or entirely insoluble in water and alkalies according to the raw material from which they are derived and to the method of their manufacture, etc. The durability of the diaphragms can be appreciably increased by treating them with the above metallic salts or, as has been found later, either by applying organic, metallic compositions of colloidal nature to the diaphragms of vegetable fibers treated with metallic salt solutions or by subjecting the fibers to compositions which are insoluble in water and alkalies, such as resinates of metals, particularly of earth metals, earth alkali metals or other metals acting similarly. Good results have been achieved in practice with colophane, magnesium compositions etc., which are produced on the fibers by means of a suitable treatment with magnesium salts and colophane solutions.

The treatment of cotton fabric diaphragms can be by way of example carried out in such a manner that the fabric, either in natural state or treated with concentrated alkali solutions, is subjected to the treatment for about 12 hours with a solution of magnesium salt, such as 10%–12% solution of magnesium chloride at a suitably high temperature (for instance 60°–70° C.). It is also possible to work at usual temperature but in this case it appears necessary to prolong the treatment correspondingly, particularly when raw fabrics are employed.

Instead of magnesium salts there can be used salts of other metals of similar effect, such as organic or inorganic salts of calcium, barium, strontium, magnesium, zinc, aluminium, chromium and copper. After being treated with metallic salts the fabric is dried; it is then subjected to the action of resinous solutions, the latter being obtained by dissolving under heat eight to ten kilos of colophane with sixteen to twenty kilos of 30% caustic soda in about hundred litres of water added to about fifteen litres of alcohol. To this solution there can be added a small amount of phenol as well as a small percentage of formaldehyde.

The treatment with resinous solutions is conveniently carried out under heat and can last for about four hours, whereafter the fabric is dried and ready for use. Instead of colophane there can be employed other resins which form with metallic salts hardly soluble and protective compositions of colloidal nature. There can be further used a suitable mixture of various resins of metallic salts. Furthermore the fabric or similar material can be treated once or more times with metallic salt solutions, and later once or more times with resin solutions; the aforementioned treatment with metallic salt solutions can be also repeated once or many times.

What is claimed is:

1. A process for the treatment of cotton or other vegetable fabrics which are used in the purification by dialysis of caustic soda and like solutions as osmotic diaphragms, which comprises subjecting the fabric in its natural state to the action of magnesium salt solution in order to transform the fibers into corresponding hydrates of cellulose of the desired grade.

2. A process for the treatment of cotton or other vegetable fabrics which are used as osmotic diaphragms in the purification by dialysis of caustic soda and like solutions which comprises treating the fabric with concentrated alkali solutions and then subjecting said fabric to the action of magnesium salt solution to transform the fibers of said fabric into the corresponding hydrates of cellulose of the desired grade.

3. A process for the treatment of cotton or other vegetable fabrics which are used as osmotic diaphragms in the purification by dialysis of caustic soda and like solutions which comprises subjecting the fabric to the action of magnesium salt solution, then drying the fabric and then treating said fabric with a resinous solution which will form upon the fabric an organic colloidal composition.

4. A process for the treatment of cotton or other vegetable fabrics which are used as osmotic diaphragms in the purification by dialysis of caustic soda and like solutions which comprises treating said fabric with a concentrated alkali solution, then subjecting said fabric to the action of a magnesium salt solution, then drying said fabric, then treating said fabric with resinous solution which will form upon said fabric an organic colloidal composition and then repeating said process.

In testimony whereof I affix this signature.

LEONARDO CERINI.